(12) United States Patent
Oishi (10) Patent No.: US 7,458,561 B2
(45) Date of Patent: Dec. 2, 2008

(54) SPOOL VALVE APPARATUS (75) Inventor: Kenichi Oishi, Obu (JP)

(73) Assignee: Denso Corporation (JP)

( * ) Notice: Subject to any disclaimer, the term of this patent is extended or adjusted under 35 U.S.C. 154(b) by 21 days.

(21) Appl. No.: 11/492,960

(22) Filed: Jul. 26, 2006

(65) Prior Publication Data

US 2007/0023722 A1 Feb. 1, 2007

(30) Foreign Application Priority Data

Jul. 26, 2005 (JP) .............................. 2005-216356

(51) Int. Cl.
*F01L 3/10* (2006.01)
(52) U.S. Cl. .............. 251/337; 251/129.15; 137/625.65
(58) Field of Classification Search ............ 251/129.15, 251/337; 137/625.65
See application file for complete search history.

(56) References Cited

U.S. PATENT DOCUMENTS

| 1,250,639 | A | * | 12/1917 | Patrick ..................... 123/90.28 |
| 4,241,753 | A | * | 12/1980 | Erwin et al. .............. 137/116.3 |
| 4,535,808 | A | * | 8/1985 | Johanson et al. ............. 137/543 |
| 4,615,507 | A | * | 10/1986 | Rousset et al. .............. 251/337 |
| 5,947,155 | A | * | 9/1999 | Miki et al. ............. 137/625.65 |
| 6,498,416 | B1 | * | 12/2002 | Oishi et al. .................. 310/214 |
| 6,827,328 | B2 | * | 12/2004 | Ha ............... 251/64 |
| 7,331,361 | B2 | * | 2/2008 | Voss .......................... 137/538 |

FOREIGN PATENT DOCUMENTS

| JP | 5-126275 | 5/1993 |
| JP | 2002-243057 | 8/2002 |
| JP | 2002-310326 | 10/2002 |
| JP | 2003-139262 | 5/2003 |
| JP | 2005-273810 | 10/2005 |

* cited by examiner

*Primary Examiner*—John K Fristoe, Jr.
(74) *Attorney, Agent, or Firm*—Nixon & Vanderhye PC

(57) ABSTRACT

A spring seat, which contacts a spool, is provided between a compression coil spring and the spool. The spring seat is shaped into a cup-shaped body, which includes a cup tubular section, a cup flange section and a cup bottom section and is fitted to a distal end shaft portion of the spool. A spring load of the spring, which is received by the cup flange section, is conducted to a distal end of the distal end shaft portion through the cup tubular section and the cup bottom section. An outer land diameter of each land of the spool is made smaller than a spring diameter of the spring.

6 Claims, 4 Drawing Sheets

SPOOL VALVE APPARATUS

CROSS REFERENCE TO RELATED APPLICATION

This application is based on and incorporates herein by reference Japanese Patent Application No. 2005-216356 filed on Jul. 26, 2005.

BACKGROUND OF THE INVENTION

1. Field of the Invention

The present invention relates to a spool valve apparatus, which includes a spool that is urged in an axial direction by a compression coil spring.

2. Description of Related Art

Japanese Unexamined Patent publication No. 2002-243057 discloses a spool valve apparatus, which includes a spool valve and a drive means (e.g., an electromagnetic actuator) to change fluid (e.g., oil), adjust a flow quantity of the fluid or adjust a pressure of the fluid.

Figure 7:
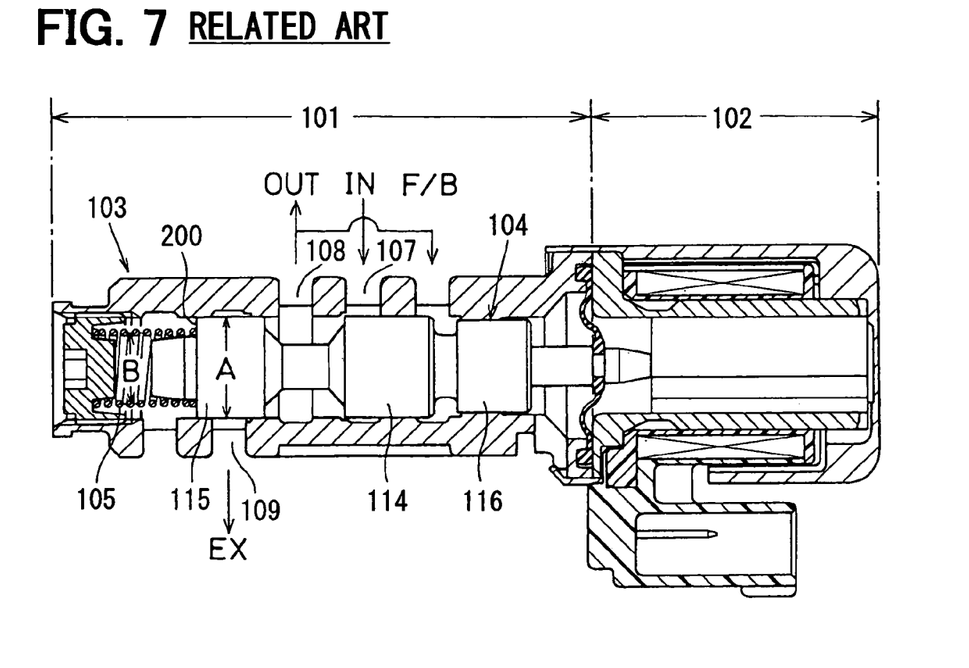
FIG. 7 is a cross sectional view of a previously proposed N/O type electromagnetic hydraulic pressure control valve.
Figure 8:
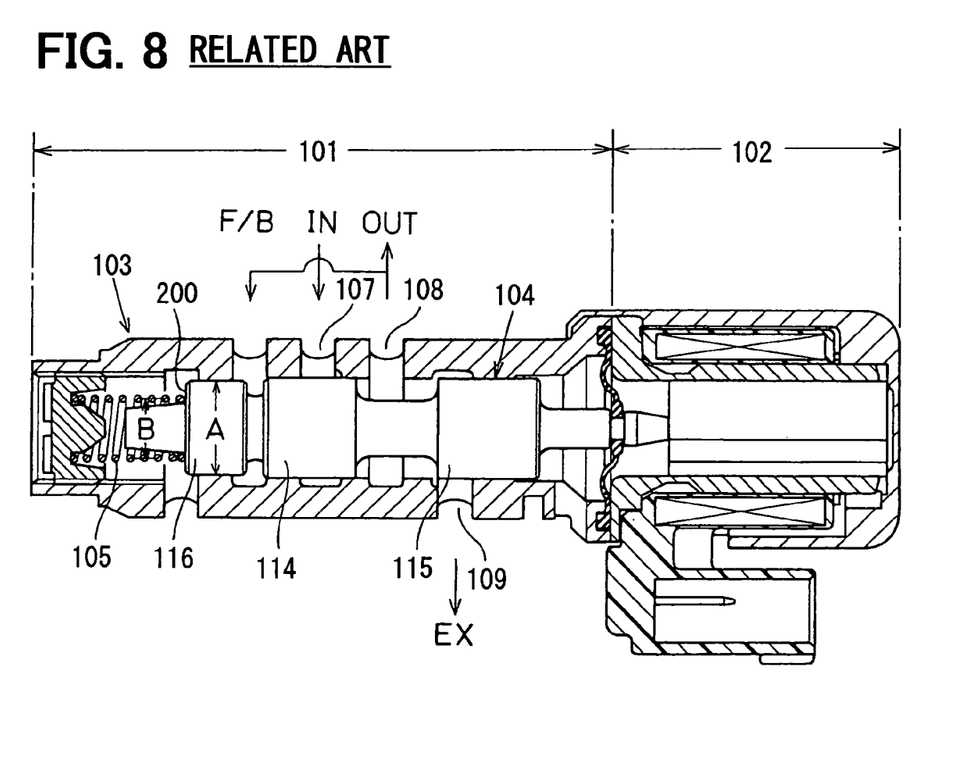
FIG. 8 is a cross sectional view of a previously proposed N/C type electromagnetic hydraulic pressure control valve.

FIGS. 7 and 8 show an exemplary case where a previously proposed spool valve apparatus is used in an electromagnetic hydraulic pressure control valve.

Specifically, FIGS. 7 and 8 show the electromagnetic hydraulic pressure control valve, which adjusts a degree of communication between an input port 107 and an output port 108 and a degree of communication between the output port 108 and an effluent port 109 through adjustment of an axial position of a spool 104. The electromagnetic hydraulic pressure control valve includes a spool valve 101 and an electromagnetic actuator 102. The spool valve 101 includes a sleeve 103, the spool 104 and a compression coil spring 105. The electromagnetic actuator 102 drives the spool 104 of the spool valve 101.

More specifically, FIG. 7 shows a normally open (hereinafter referred to as "N/O") type electromagnetic hydraulic pressure control valve, in which the degree of communication between the input port 107 and the output port 108 is maximized while the degree of communication between the output port 108 and the effluent port 109 is minimized (closed) in an OFF state of the electromagnetic actuator 102.

Furthermore, FIG. 8 shows a normally closed (hereinafter referred to as "N/C") type electromagnetic hydraulic pressure control valve, in which the degree of communication between the input port 107 and the output port 108 is minimized (closed) while the degree of communication between the output port 108 and the effluent port 109 is maximized in the OFF state of the electromagnetic actuator 102.

The spool valve 101 adjusts the degree of communication of each port 107, 108, 109 by axially moving the spool 104 in the tubular sleeve 103. Thus, a slide clearance exists between the sleeve 103 and the spool 104 (specifically, each land 114, 115, 116). A portion of the hydraulic pressure leaks through the slide clearance, so that there is a demand for decreasing the amount of leakage of the hydraulic pressure through the slide clearance.

A seal performance for sealing the oil at the slide clearance is determined based on an axial distance (an axial seal distance) of the slide clearance and a radial size (a radial clearance size) of the slide clearance.

The axial distance of the slide clearance is limited by, for example, the installability of the spool valve 101, more specifically an available installation space of the spool valve 101.

In order to significantly reduce the radial size of the slide clearance, the processing accuracy for processing the sleeve 103 and the spool 104 needs to be increased, resulting in an increase in the manufacturing costs. Also, when the radial size of the slide clearance is significantly reduced, the slide resistance is increased, thereby deteriorating the responsibility of the spool 104. Furthermore, even when the radial size of the slide clearance is significantly reduced, the slide clearance still exits, and thereby the oil still leaks through the slide clearance.

In order to address the above disadvantage, it is conceivable to reduce an outer land diameter of each land 114, 115, 116 of the spool 104 to reduce an entire clearance cross sectional area of the slide clearance to limit the oil leakage of the spool valve 101 through the slide clearance.

In the previously proposed technique, as shown in FIGS. 7 and 8, the outer land diameter of each land 114, 115, 116 is larger than a spring diameter (a means spring diameter) B of the compression coil spring 105. Thus, the outer land diameter of the closest land (the effluent seal land 115 in FIG. 7 or the F/B land 116 in FIG. 8), which is closest to the compression coil spring 105, is larger than the spring diameter B of the compression coil spring 105 (A>B). Therefore, a spring support 200, which supports the compression coil spring 105, can be provided to the spool 104.

(1) However, when the spring diameter B is reduced in response to the reduction of the outer land diameter A, the spring performance of the compression coil spring 105 is significantly reduced, so that the technique of reducing the outer land diameter A is not acceptable in the cases of FIGS. 7 and 8.

(2) Furthermore, it is conceivable to reduce the spring diameter B of only an end portion of the compression coil spring 105, which contacts the spool 104 (see, for example, the technique of reducing the spring diameter of the spring recited in Japanese Unexamined Patent Publication No. 5-126275). However, similar to the above case, the end portion of the compression coil spring, which has the reduced spring diameter, cannot provide the sufficient spring performance. Therefore, the technique of reducing the outer land diameter A is still not acceptable.

Figure 9:
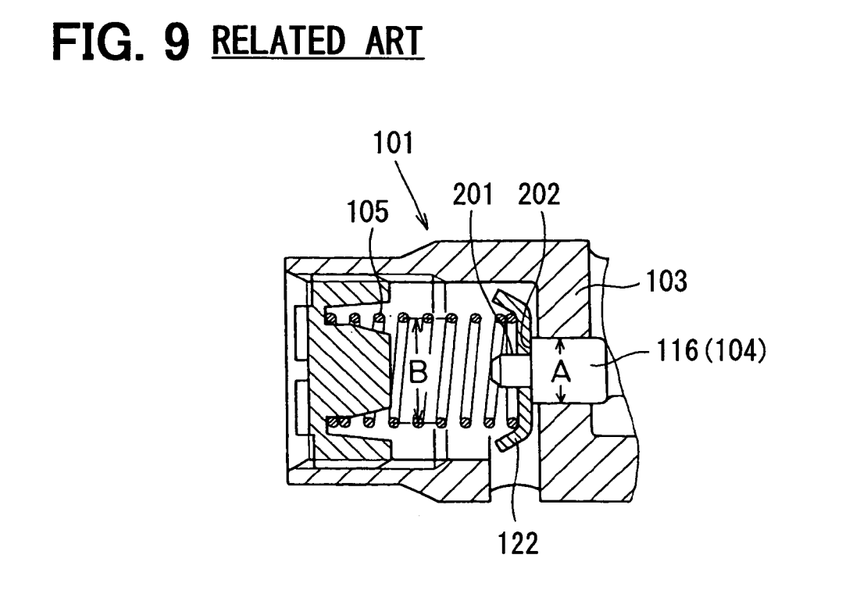
FIG. 9 is a partial cross sectional view of another previously proposed electromagnetic hydraulic pressure control valve.

(3) With reference to FIG. 9, there is also another technique, in which a projection 201 is provided at the axial end of the spool 104, and an annular plate-shaped (doughnut-shaped) spring seat 122 is installed by, for example, press fitting to the projection 201 to receive the compression coil spring 105. In this way, only the outer land diameter A can be reduced while the spring diameter B is unchanged.

However, the spool 104 needs to have a spring seat support surface 202 around the projection 201. Thus, when the outer land diameter A is reduced, it is difficult to provide the required spring seat support surface 202. Therefore, the spring seat 122 cannot be installed to the spool 104.

Because of the above reasons (1) to (3), in the previously proposed techniques, it is not possible to reduce the outer land diameter A of the closest land of the spool 104, which is closest to the compression coil spring 105 while maintaining the sufficiently large spring diameter B at the end portion of the compression coil spring 105, which contacts the spool 104.

SUMMARY OF THE INVENTION

Therefore, it is an objective of the present invention to provide a spool valve apparatus, which can address or alleviate the above disadvantage.

To achieve the objective of the present invention, there is provided a spool valve apparatus, which includes a drive means and a spool valve. The drive means is for generating a drive force in a first axial direction. The spool valve includes a sleeve, a spool, a compression coil spring and a spring seat. The spool is slidably supported in the sleeve and is driven in the first axial direction by the drive means. The compression coil spring urges the spool in a second axial direction, which is opposite from the first axial direction. A spring diameter of an end portion of the compression coil spring, which is adjacent to the spool, is larger than an outer land diameter of a closest land of the spool, which is closest to the compression coil spring and slidably engages the sleeve. The spring seat contacts the spool such that the compression coil spring urges the spool in the second axial direction through the spring seat. The spring seat includes a cup tubular section, a cup flange section and a cup bottom section. The cup tubular section covers an outer peripheral surface of a distal end shaft portion of the spool. The cup flange section is shaped into a flange form, which radially outwardly extends from one axial end of the cup tubular section. The end portion of the compression coil spring seats against the cup flange section. The cup bottom section closes the other end of the cup tubular section and contacts a distal end of the distal end shaft portion of the spool to conduct a spring load of the compression coil spring to the spool. The cup tubular section, the cup flange section and the cup bottom section are formed integrally.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A spool valve apparatus of a first embodiment, which is implemented as an electromagnetic hydraulic pressure control valve, will be described with reference to FIGS. 1 and 2. In the first embodiment, a basic structure of the electromagnetic hydraulic pressure control valve will be described first, and then characteristics of the first embodiment will be described.

Figure 2:
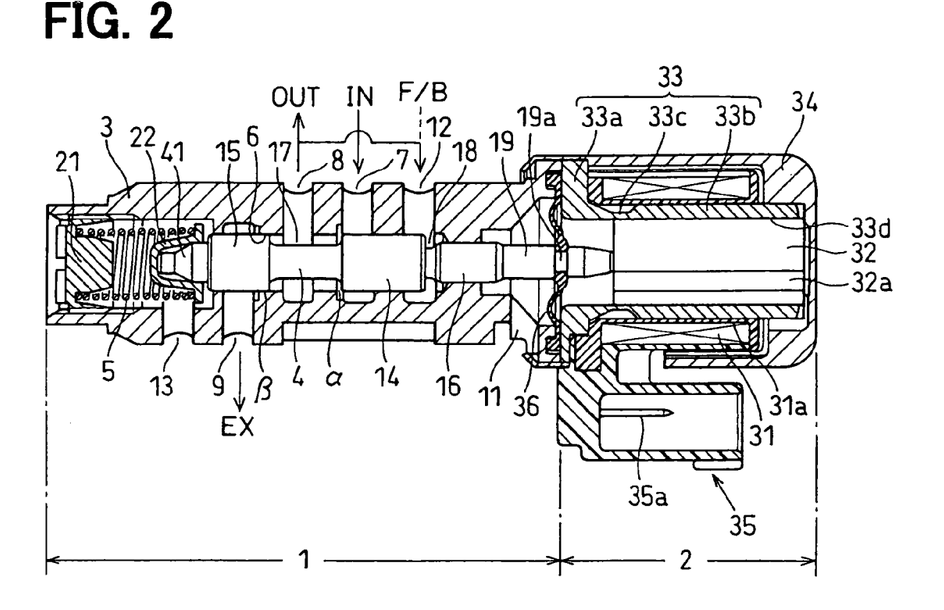
FIG. 2 is a cross sectional view of an N/O type electromagnetic hydraulic pressure control valve according to the first embodiment.

The electromagnetic hydraulic pressure control valve shown in FIG. 2 is installed in, for example, a hydraulic pressure control system of an automatic transmission apparatus and includes a spool valve 1 and an electromagnetic actuator 2. The spool valve 1 serves as a hydraulic pressure control valve that changes (shifts) or adjusts the hydraulic pressure. The actuator 2 corresponds to a drive means for driving the spool valve 1. In the first embodiment, the electromagnetic hydraulic pressure control valve is of the N/O type, in which a degree of communication between an input port 7 and an output port 8 (described in detail below) is maximized while a degree of communication between the output port 8 and an effluent port 9 is minimized (closed) in an OFF state of the electromagnetic actuator 2.

The spool valve 1 includes a sleeve 3, a spool 4 and a compression coil spring (a return spring) 5.

The sleeve 3 is constructed to be received in a case of a hydraulic pressure controller (not shown) and is shaped into a generally cylindrical form.

The sleeve 3 includes a receiving hole 6, the input port 7, the output port 8 and the effluent port 9. The receiving hole 6 axially slidably receives the spool 4. The input port 7 is communicated with an oil delivery outlet of an oil pump (a hydraulic pressure generating means) and receives an input hydraulic pressure from the oil pump. The output port 8 outputs an output pressure, which is adjusted by the spool valve 1. The effluent port 9 is communicated with a low pressure side (e.g., an oil pan).

The oil ports, such as the input port 7, the output port 8 and the effluent port 9, are holes formed in a peripheral wall of the sleeve 3. More specifically, a drain port 11 for diaphragm chamber breathing purpose, a feedback (F/B) port 12, the input port 7, the output port 8, the effluent port 9 and a drain port 13 for spring chamber breathing purpose are formed in this order from the right side (an electromagnetic actuator 2 side) to the left side (an opposite side that is opposite from the electromagnetic actuator 2 side) in the peripheral wall of the sleeve 3. The F/B port 12 is communicated with the output port 8 and generates an F/B hydraulic pressure, which corresponds to the output pressure, in the spool 4.

The spool 4 is slidably received in the sleeve 3 and includes an input seal land 14, an effluent seal land 15 and an F/B land 16. The input seal land 14 seals the input port 7. The effluent seal land 15 seals the effluent port 9. The F/B land 16 has an outer diameter, which is smaller than that of the input seal land 14. A distribution chamber 17 is formed between the input seal land 14 and the effluent seal land 15, and an F/B chamber 18 is formed between the input seal land 14 and the F/B land 16. The F/B land 16 seals between the F/B chamber 18 and a diaphragm chamber where a diaphragm 36 (described below in detail) is provided.

A land diameter (an outer land diameter) of the F/B land 16 is made smaller than that of the input seal land 14. Thus, when the hydraulic pressure (the output pressure), which is applied to the F/B chamber 18, is increased, a resistive axial force, which acts against a spring load of the compression coil spring 5, is generated in the spool 4 due to a pressure difference caused by the land difference between the input seal land 14 and the F/B land 16. In this way, the displacement of the spool 4 is stabilized, and thereby it is possible to limit a change in the output pressure caused by a change in the input pressure. The spool 4 stops at a balanced position where the spring load of the compression coil spring 5, the drive force of the spool 4 caused by the electromagnetic actuator 2 and the axial force caused by the land difference between the input seal land 14 and the F/B land 16 are balanced.

The spool 4 has a shaft 19, which extends into an interior of the electromagnetic actuator 2. A distal end of the shaft 19 contacts an end surface of a plunger 32 described below, and thereby the plunger 32 directly drives the spool 4.

In the spool valve 1, the spool 4 is axially displaced through the operation of the electromagnetic actuator 2, so that a ratio between an input side seal length (a lap α) and an effluent side seal length (a lap β) is changed, and thereby the output pressure of the oil generated in the output port 8 is changed. Here, the input side seal length (the lap α) is a length of the seal made by the input seal land 14 between the input port 7 and the distribution chamber 17, and the effluent side seal length (the lap β) is a length of the seal made by the effluent seal land 15 between the distribution chamber 17 and the effluent port 9.

The compression coil spring 5 is a spirally and cylindrically wound coil spring, which urges the spool 4 in a valve opening side (a side where the input side seal length is decreased to increase the output pressure, i.e., a right side in FIG. 2) and is positioned in a spring chamber of the sleeve 3 located on a left side in FIG. 2. One end of the compression coil spring 5 contacts a bottom surface of the adjust screw 21, which closes a left end of the receiving hole 6 of the sleeve 3, and the other end of the compression coil spring 5 contacts a spring seat 22, which is installed to the end of the spool 4. By adjusting an amount of thread engagement (an amount of insertion) of the adjust screw 21, the spring load of the compression coil spring 5 can be adjusted. The spring seat 22 will be described latter.

The electromagnetic actuator 2 includes a coil 31, the plunger 32, a stator 33, a yoke 34 and a connector 35.

A wire coated with a dielectric coating is wound many times around a resin bobbin 31a to form the coil 31. When electric power is supplied to the coil 31, the coil 31 generates a magnetic force, so that a magnetic flux loop, which passes the plunger 32 and a magnetic stator (the stator 33 and a yoke 34), is generated.

The plunger 32 is a generally cylindrical body made of magnetic metal, such as iron, which serves as a ferromagnetic material that constitutes a magnetic circuit.

The plunger 32 directly and slidably contacts an inner peripheral surface of the stator 33.

The plunger 32 directly contacts the distal end of the shaft 19. The spring load of the compression coil spring 5 urges the spool 4 and the plunger 32 in the valve opening side (the right side in FIG. 2).

A hole 32a extends axially through the plunger 32 and serves as a breathing hole, which communicates between opposed ends of the plunger 32.

The stator 33 is made of magnetic metal, such as iron, which serves as a ferromagnetic material that constitutes the magnetic circuit. The stator 33 includes an attractive stator portion 33a and a slide stator portion 33b. The attractive stator portion 33a magnetically attracts the plunger 32 in the axial direction. The slide stator portion 33b covers an outer peripheral surface of the plunger 32 and conducts the magnetic flux to and from the plunger 32 in the radial direction. The attractive stator portion 33a and the slide stator portion 33b are substantially magnetically shielded from each other by a magnetism shield groove (a portion that has a large magnetoresistance) 33c.

An axial hole 33d is formed radially inward of the stator 33. The axial hole 33d axially slidably supports the plunger 32. The axial hole 33d is a through hole, which extends through the stator 33 from one end to the other end of the stator 33 and which has a constant inner diameter along an entire length of the axial hole 33d.

The attractive stator portion 33a is held between the sleeve 3 and the coil 31 and is magnetically coupled with an opening of the yoke 34. The attractive stator portion 33a magnetically attracts the plunger 32 toward the valve closing side (the side, i.e., the left side in FIG. 2, at which the input port 7 is closed, and thereby the output pressure is decreased) through use of the magnetic force, which is generated by the coil 31.

Furthermore, the attractive stator portion 33a includes a tubular portion that overlaps with the plunger 32 in the axial direction when the attractive stator portion 33a magnetically attracts the plunger 32. An outer peripheral surface of the tubular portion is tapered to limit a change in the magnetic attractive force with respect to an amount of stroke of the plunger 32.

The slide stator portion 33b is shaped into a generally cylindrical body that surrounds generally the entire outer peripheral surface of the plunger 32. The slide stator portion 33b is magnetically coupled with a bottom portion of the yoke 34. The slide stator portion 33b directly and slidably contacts the plunger 32 to axially slidably support the plunger 32. Furthermore, the slide stator portion 33b conducts the magnetic flux to and from the plunger 32 in the radial direction.

The yoke 34 is shaped into a generally cup-shaped body that is made of magnetic metal, such as iron, which serves as a ferromagnetic material that constitutes the magnetic circuit. The yoke 34 covers the outer peripheral surface of the coil 31 to conduct the magnetic flux. The yoke 34 is securely connected to the sleeve 3 by radially inwardly bending a claw part that is formed at an open end of the yoke 34.

The diaphragm 36 is provided at a connection between the spool valve 1 and the electromagnetic actuator 2 to partition between the interior of the sleeve 3 and the interior of the electromagnetic actuator 2. The diaphragm 36 is a generally ring-shaped rubber body. An outer peripheral part of the diaphragm 36 is held between the sleeve 3 and the stator 33, and a center portion of the diaphragm 36 is fitted to a groove 19a formed in an outer peripheral surface of the shaft 19. The diaphragm 36 limits intrusion of oil or debris from the interior of the sleeve 3 into the interior of the electromagnetic actuator 2.

The connector 35 is a connecting means for electrically connecting with an electronic control unit (not shown), which controls the electromagnetic hydraulic pressure control valve, through an electric connection line. Terminals 35a are placed in the interior of the connector 35 and are connected to ends of the coil 31.

The electronic control unit controls an amount of electric power (an electric current value) supplied to the coil 31 of the electromagnetic actuator 2 through a duty ratio control operation. By controlling the amount of electric power supplied to the coil 31, the electronic control unit linearly changes the axial position of the plunger 32 and of the spool 4 against the spring load of the compression coil spring 5 to change the ratio between the input side seal length (the lap α) and the effluent side seal length (the lap β) and thereby to control the output pressure generated in the output port 8.

According to the first embodiment, the outer land diameter of each land 14, 15, 16 is made small, so that a total clearance cross sectional area of the slide clearance between each land 14, 15, 16 and the sleeve 3 is reduced to limit the amount of oil leakage at the spool valve 1 in comparison to those described with reference to FIGS. 7 and 8.

Specifically, in the first embodiment, the outer land diameter of each land 14, 15, 16 is made smaller than a spring diameter (a means spring diameter) B of the compression coil spring 5 to limit the amount of oil leakage in the spool valve 1.

Thus, the outer land diameter A of the closest land (the effluent seal land 15 in the first embodiment), which is closest to the compression coil spring 5 among the lands 14, 15, 16, is made smaller than the spring diameter B of the compression coil spring 5.

Specifically, now it is assumed that the outer land diameter of the effluent seal land 15, which is the closest slidable portion of the spool 4 that is closest to the compression coil spring 5 and slidably contacts the sleeve 3, is set to be A, and the spring diameter of the compression coil spring 5, which is measured at the end portion of the compression coil spring 5 that is adjacent to the spool 4, is set to be B (the spring diameter B being constant along its entire axial length in the first embodiment). In such a case, a relationship of A<B should be satisfied.

Furthermore, according to the first embodiment, the spring seat 22, which contacts the spool 4, is provided between the compression coil spring 5 and the spool 4 to contact the spool 4. The spring load of the compression coil spring 5 is conducted to the spool 4 through the spring seat 22.

Figure 1:
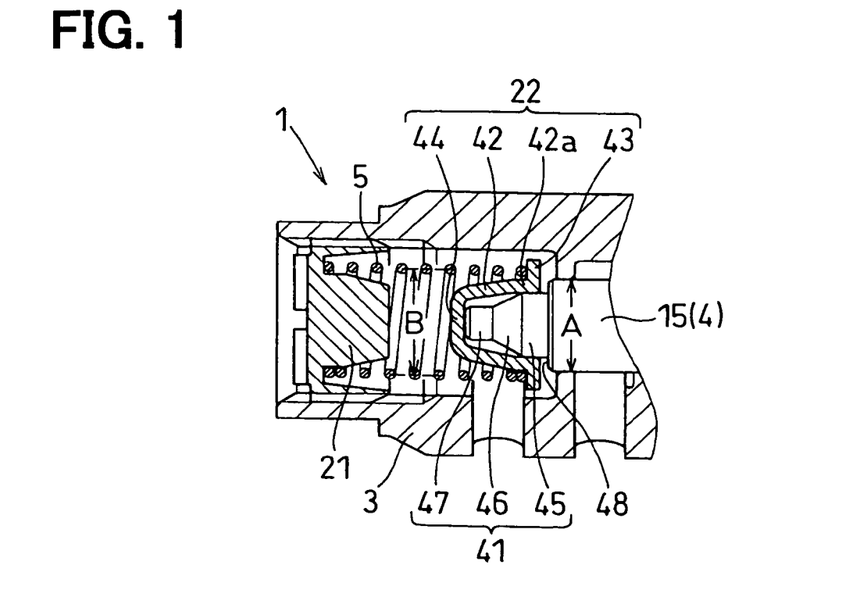
FIG. 1 is a partial cross sectional view of an electromagnetic hydraulic pressure control valve according to a first embodiment of the present invention.

As shown in FIG. 1, the spring seat 22 is formed as a cup-shaped body that has a flanged opening and includes a cup tubular section 42, a cup flange section 43 and a cup bottom section 44, which are formed integrally. The spring seat 22 may be formed by press working of a metal plate (e.g., a stainless plate), cutting of a metal material (e.g., a stainless block) or the like technique.

A distal end shaft portion 41 is formed integrally with the spool 4 at a distal end of the spool 4, which is on the compression coil spring 5 side of the spool 4 (more specifically, the compression coil spring 5 side of the effluent seal land 15 of the spool 4). An outer diameter of the distal end shaft portion 41 is smaller than the outer land diameter of the effluent seal land 15.

The distal end shaft portion 41 includes a small diameter shaft section (a cylindrical shaft section) 45, a tapered shaft section 46 and a projecting section 47, which are arranged in this order from the left end of the effluent seal land 15 toward the left side in FIG. 1. The small diameter shaft section 45 is shaped into a cylindrical form having a cylindrical outer peripheral surface and radially contacts the cup tubular section 42. The tapered shaft section 46 is shaped as a frustum of cone. The projecting section 47 is shaped into a small diameter cylinder, which has an outer diameter smaller than that of the small diameter shaft section 45.

An axial length of the cup tubular section 42 is made smaller than an axial length of the distal end shaft portion 41, so that the spring seat 22 does not contact a step 48 between the small diameter shaft section 45 and the effluent seal land 15.

The cup tubular section 42 covers an outer peripheral surface of the distal end shaft portion 41. An opening side tubular part (a part of the cup tubular section 42, which radially contacts an outer peripheral surface of the distal end shaft portion 41, i.e., an inner peripheral part of the cup flange section 43) 42a is shaped into a cylindrical form having a cylindrical inner peripheral surface. The cylindrical inner peripheral surface of the opening side tubular part 42a contacts the cylindrical outer peripheral surface of the small diameter shaft section 45, so that the spring seat 22 is securely held in such a manner that the spring seat 22 is coaxial with the spool 4.

As described above, the part of the cup tubular section 42, which contacts the spool 4, does not axially engage the spool 4, so that the spring load of the compression coil spring 5 is not conducted from the cup tubular section 42 to the spool 4. Specifically, the spring load of the compression coil spring 5, which is received by the cup flange section 43, is conducted to the spool 4 only from the cup bottom section 44.

The cup flange section 43 is shaped into a flange form, which radially outwardly extends from the end (the outer peripheral edge of the opening end) of the cup tubular section 42. The cup flange section 43 is axially spaced from an axial end surface (a left end surface in FIG. 1) of the effluent seal land 15 of the spool 4. The maximum outer diameter of the cup flange section 43 is made larger than the spring diameter B, and the end portion of the compression coil spring 5 contacts the cup flange section 43. A material and a wall thickness of the spring seat 22 are determined to enable reception of the spring load of the compression coil spring 5 by the cup flange section 43.

The cup bottom section 44 is a bottom section that closes the other end of the cup tubular section 42 and contacts the axial distal end (the distal end of the cylindrical projecting section 47 in this embodiment) of the spool 4 to conduct the spring load of the compression coil spring 5 to the spool 4.

Now, advantages of the first embodiment will be described.

The spring seat 22 of the electromagnetic hydraulic pressure control valve of the first embodiment is shaped into the cup-shaped body, which includes the cup tubular section 42 and the cup bottom section 44 and is fitted to the axial distal end of the spool 4. Furthermore, the cup flange section 43, which is provided to the outer peripheral surface of the cup-shaped body, conducts the spring load of the compression coil spring 5 to the distal end of the spool 4 through the cup tubular section 42 and the cup bottom section 44.

Thus, the outer land diameter of each land 14, 15, 16 can be made smaller than the spring diameter B of the compression coil spring 5. Therefore, the amount of oil leakage at the spool valve 1 can be limited, and the spring load of the compression coil spring 5, which has the unreduced spring diameter, can be conducted to the spool 4 while satisfying the relationship of the outer land diameter A<the spring diameter B. That is, the N/O type electromagnetic hydraulic pressure control valve, which limits the oil leakage, can be provided.

Furthermore, the spring diameter B can be kept the same, i.e., the single size regardless the outer land diameter A. In other words, there is no need to stock various types of compression coil springs, which have different spring diameters. In this way, the versatility of the compression coil spring 5 is increased, and thereby the manufacturing costs of the electromagnetic hydraulic pressure control valve can be limited.

Furthermore, the spring seat support surface 202 around the projection 201 described with respect to the previously proposed valve apparatus in view of FIG. 9 is not required. Thus, even when the outer land diameter A is reduced, the cup-shaped body, which includes the cup tubular section 42 and the cup bottom section 44, can be fitted to the axial distal end of the spool 4. Therefore, even when the outer land diameter A is reduced, the spring seat 22 can be provided to the end of the spool 4.

Second Embodiment

Figure 3:
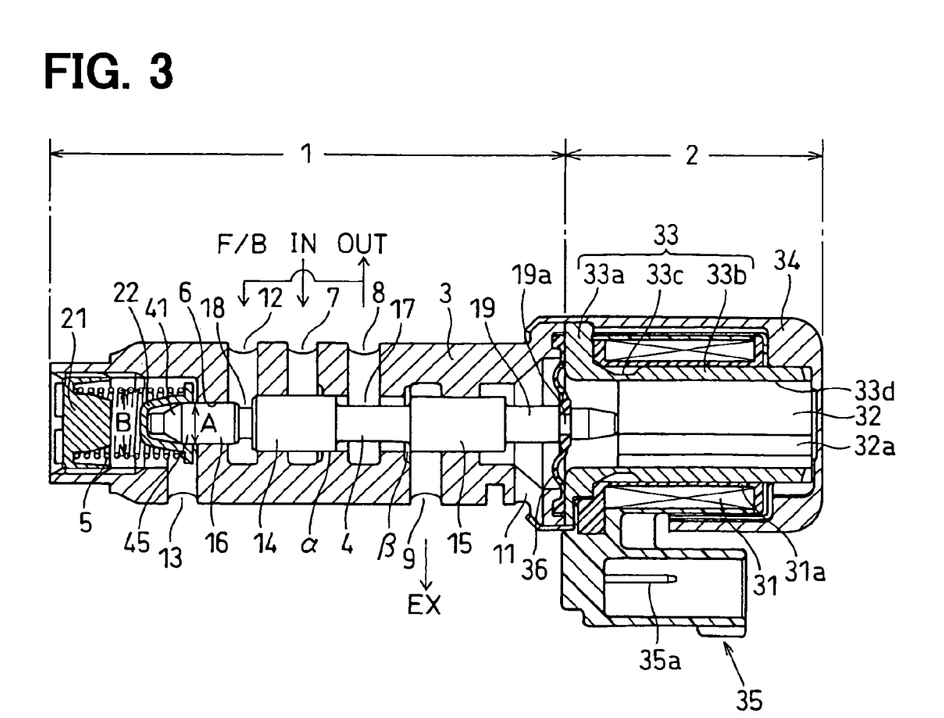
FIG. 3 is a cross sectional view of an N/C type electromagnetic hydraulic pressure control valve according to a second embodiment of the present invention.

A second embodiment of the present invention will be described with reference to FIG. 3. In the following embodiments, components similar to those of the first embodiment will be indicated by the same numerals.

In the first embodiment, there is described the N/O type electromagnetic hydraulic pressure control valve, in which the degree of communication between the input port 7 and the output port 8 is maximized while the degree of communication between the output port 8 and the effluent port 9 is minimized (closed) in the OFF state of the electromagnetic actuator 2.

In contrast, according to the second embodiment, there will be described the N/C type electromagnetic hydraulic pressure control valve, in which the degree of communication between the input port 7 and the output port 8 is minimized (closed) while the degree of communication between the output port 8 and the effluent port 9 is maximized in the OFF state of the electromagnetic actuator 2.

Specifically, the outer land diameter of each land 14, 15, 16 is made smaller than the spring diameter B of the compression coil spring 5. Therefore, the amount of oil leakage at the spool valve 1 can be limited, and the spring load of the compression coil spring 5 can be conducted to the spool 4 while satisfying the relationship of the outer land diameter A<the spring diameter B. That is, the N/C type electromagnetic hydraulic pressure control valve, which limits the oil leakage, can be provided.

In the second embodiment, the F/B land 16 is the closest slidable land of the spool 4 that is closest to the compression coil spring 5 and slidably contacts, i.e., engages the sleeve 3, and the outer land diameter of the F/B land 16 is set to be A.

In the second embodiment, an end portion of the F/B land 16, which is located at the compression coil spring 5 side of the F/B land 16, serves as the small diameter shaft section 45 described in the first embodiment.

Third Embodiment

Figure 4:
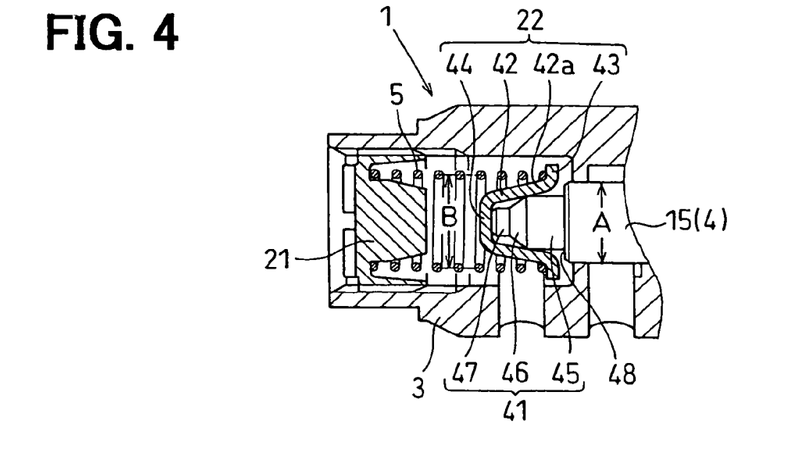
FIG. 4 is a partial cross sectional view of an electromagnetic hydraulic pressure control valve according to a third embodiment of the present invention.

A third embodiment of the present invention will be described with reference to FIG. 4.

In the above embodiments, the opening side tubular part 42*a* of the cup tubular section 42, which contacts the spool 4, is formed as the cylindrical form.

In contrast, according to the third embodiment, the opening side tubular part 42*a* of the cup tubular section 42, which contacts the spool 4, is shaped into a conical tubular form having a conical inner peripheral surface. The small diameter shaft section 45 of the distal end shaft portion 41 is shaped into a cylindrical form like in the first embodiment.

Specifically, the contacting part of the distal end shaft portion 41, which radially contacts the cup tubular section 42, is an outer peripheral edge of the cylindrical body (the cylindrical shaft section 45) of the distal end shaft portion 41, and the contacting part of the cup tubular section 42, which radially contacts the outer peripheral edge of the distal end shaft portion 41, is the conical inner peripheral surface of the conical tubular part 42*a*.

In the first embodiment, the contact between the cup tubular section 42 and the spool 4 is the surface contact along the cylindrical contact surface of the shaft section 45 and the cylindrical surface of the cup tubular section 42. However, in the third embodiment, the contact between the cup tubular section 42 and the spool 4 is the line contact along the circular edge of the shaft section 45.

Fourth Embodiment

A fourth embodiment of the present invention will be described with reference to FIG. 5.

In the above embodiments, the projecting section 47 is shaped into the cylindrical form, so that the axial end of the projecting section 47 has a flat end surface, which extends perpendicular to the axial direction. Therefore, the cup bottom section 44 and the distal end of the projecting section 47 are both planar. Because of this arrangement, when the spring seat 22 is tilted in the axial direction, the planar cup bottom section 44 and the planar axial end of the spool 4 form the biased contact and thereby cannot make the surface contact, thereby leaving a tilted space between the plane of the cup bottom section 44 and the plane of the distal end of the projecting section 47.

In this state, when the spool 4 is moved to increase the spring load of the compression coil spring 5, the tilted space may be eliminated in some cases. In contrast, when the spool 4 is moved in the opposite direction to reduce the spring load of the compression coil spring 5, the tilted space may be generated once again.

The generation and the elimination of the tilted space between the cup bottom section 44 and the projecting section 47 may possibly cause a change in the axial position of the spool 4.

Figure 5:
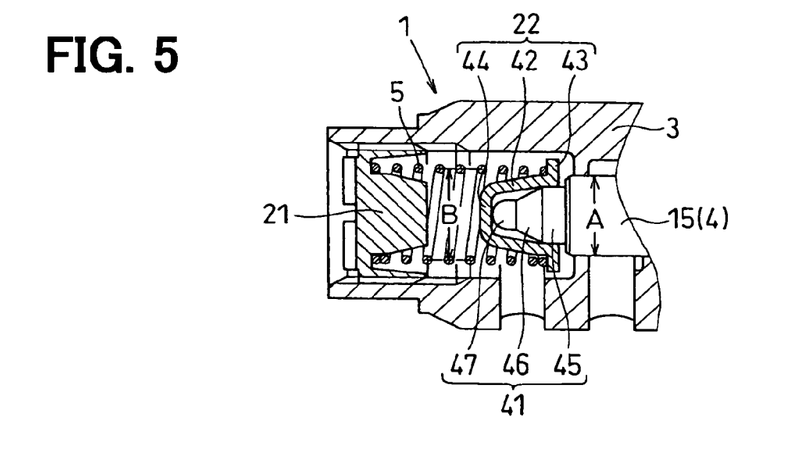
FIG. 5 is a partial cross sectional view of an electromagnetic hydraulic pressure control valve according to a fourth embodiment of the present invention.

In view of this, according to the fourth embodiment, the axial end part of the spool 4, i.e., the axial end part of the projecting section 47, which contacts the cup bottom section 44, is configured to have a spherical surface, as shown in FIG. 5.

With this configuration, even when the spring seat 22 is tilted in the axial direction, the axial contact surface area between the cup bottom section 44 and the spool 4 is concentrated at the single location. Therefore, the generation of the tilted space between the cup bottom section 44 and the projecting section 47 will not likely occur, and thereby the change in the axial position of the spool 4 caused by the tilted space will not likely occur.

Fifth Embodiment

A fifth embodiment of the present invention will be described with reference to FIG. 6.

In the above embodiments, the cup flange section 43 is shaped into the annular plate form.

Figure 6:
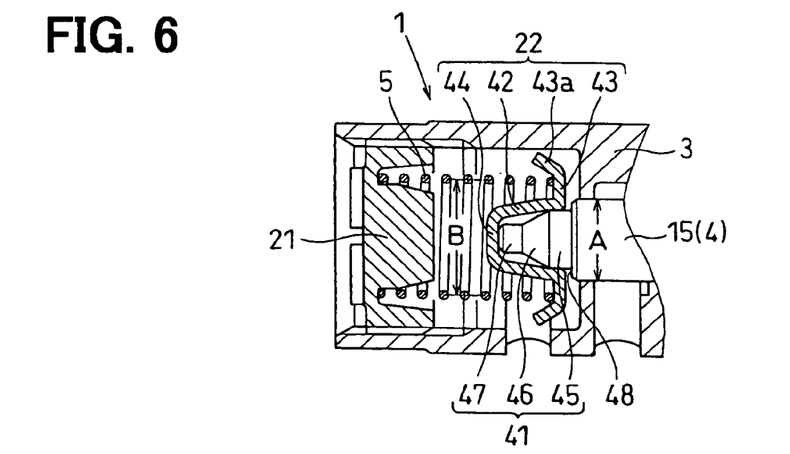
FIG. 6 is a partial cross sectional view of an electromagnetic hydraulic pressure control valve according to a fifth embodiment of the present invention.

In contrast, according to the fifth embodiment, as shown in FIG. 6, a spring guide 43*a* is provided to the outer peripheral edge of the cup flange section 43 to axially obliquely extend from the outer peripheral edge of the cup flange section 43 on the compression coil spring 5 side of the cup flange section 43 in a direction away from the land 15.

In the case where the spring guide 43*a* is provided to the outer peripheral edge of the cup flange section 43, even when the spring diameter B of the compression coil spring 5 varies slightly from spring to spring, the compression coil spring 5 can be effectively supported by the cup flange section 43. In this way, the versatility of the spring seat 22 is increased, and thereby the manufacturing costs can be limited.

Now, modifications of the above embodiments will be described.

In the above embodiments, the present invention is implemented in the electromagnetic hydraulic pressure control valve used in the hydraulic pressure control system of the automatic transmission apparatus. Alternatively, the present invention can be implemented in an electromagnetic hydraulic pressure control valve of any other apparatus or system.

In the above embodiments, the present invention is implemented in the three-way valve. However, the spool valve 1 is not limited to the three-way valve. Specifically, the present invention may be implemented in any spool valve apparatus, in which the spool valve 1 including the sleeve 3 and the spool 4 is driven by the drive means.

In the above embodiments, the electromagnetic actuator 2 is used as the drive means for driving the spool valve 1. Alternatively, it is possible to use any other drive means, such as a linear drive actuator having an electric motor, a piezoactuator having a piezo stack, a fluid actuator using a hydraulic pressure, a negative pressure or the like.

Additional advantages and modifications will readily occur to those skilled in the art. The invention in its broader terms is therefore not limited to the specific details, representative apparatus, and illustrative examples shown and described.

What is claimed is:

1. A spool valve apparatus comprising a drive means for generating a drive force in a first axial direction and a spool valve that includes:
    a sleeve;
    a spool that is slidably supported in the sleeve and is driven in the first axial direction by the drive means;
    a compression coil spring that urges the spool in a second axial direction, which is opposite from the first axial direction, wherein a spring diameter of an end portion of the compression coil spring, which is adjacent to the spool, is larger than an outer land diameter of a closest land of the spool, which is closest to the compression coil spring and slidably engages the sleeve; and
    a spring seat that contacts the spool such that the compression coil spring urges the spool in the second axial direction through the spring seat, wherein the spring seat includes:
        a cup tubular section that covers an outer peripheral surface of a distal end shaft portion of the spool;
        a cup flange section that is shaped into a flange form, which radially outwardly extends from one axial end of the cup tubular section, wherein the end portion of the compression coil spring seats against the cup flange section; and
        a cup bottom section that is imperforate in an axial direction so that it closes the other end of the cup tubular section and axially contacts a distal end of the distal end shaft portion of the spool to conduct a spring load of the compression coil spring to the spool, wherein the cup tubular section, the cup flange section and the cup bottom section are formed integrally, wherein:
    the distal end shaft portion of the spool includes a cylindrical outer peripheral surface that radially contacts the cup tubular section; and
    the cup tubular section has a cylindrical inner peripheral surface, which radially contacts the cylindrical outer peripheral surface of the distal end shaft portion of the spool.

2. The spool valve apparatus according to claim 1, wherein the distal end of the distal end shaft portion of the spool, which contacts the cup bottom section, has a spherical end surface.

3. The spool valve apparatus according to claim 1, wherein the spring seat further includes a spring guide, which axially obliquely extends from an outer peripheral edge of the cup flange section on a compression coil spring side of the cup flange section.

4. The spool valve apparatus according to claim 1, wherein the spool valve is a hydraulic pressure control valve, which changes or adjusts a hydraulic pressure.

5. The spool valve apparatus according to claim 1, wherein the drive means is an electromagnetic actuator, which includes:
    a coil that generates a magnetic force upon energization thereof;
    a plunger that is axially slidably supported; and
    a stator that includes an attractive stator portion, which axially magnetically attracts the plunger through use of the magnetic force generated by the coil 6. The spool valve apparatus according to claim 1, wherein the cup flange section is axially spaced from an axial end surface of the closest land of the spool

* * * * *